United States Patent [19]
Henry et al.

[11] 3,856,753
[45] Dec. 24, 1974

[54] COPOLYESTER POLYMER OF ENHANCED DYEABILITY

[75] Inventors: Charles Leroy Henry, Asheville; Gerald Willard McNeely, Arden, both of N.C.

[73] Assignee: Akzona Incorporated, Asheville, N.C.

[22] Filed: July 17, 1972

[21] Appl. No.: 272,243

[52] U.S. Cl............... 260/75 N, 8/DIG. 4, 260/75 S
[51] Int. Cl............................................ C08g 17/08
[58] Field of Search......................... 260/75 N, 75 S

[56] References Cited
UNITED STATES PATENTS

| | | | |
|---|---|---|---|
| 2,925,404 | 2/1960 | Caldwell et al. | 260/49 |
| 3,018,272 | 1/1962 | Griffing et al. | 260/75 |
| 3,313,778 | 4/1967 | Sakurai et al. | 260/49 |
| 3,700,644 | 10/1972 | Price et al. | 260/75 |

*Primary Examiner*—Melvin Goldstein
*Attorney, Agent, or Firm*—Francis W. Young; Jack H. Hall

[57] ABSTRACT

Copolyester polymer of enhanced dyeability, said copolyester having, as an integral part of the polymer chain, repeating sulfonate group containing comonomer dye sensitizing units such as the sodium salt of N-methyl-N(3,5-dicarbomethoxy)benzenesulfonyl taurine.

10 Claims, No Drawings

COPOLYESTER POLYMER OF ENHANCED DYEABILITY

PRIOR ART

Polymeric polyesters are readily prepared by heating together dihydric alcohols and dibasic carboxylic acids or polyester-forming derivatives thereof such as acid halides or simple esters of volatile alcohols. Highly polymerized polyesters can be formed into filaments, fibers, films, and the like which can be oriented. The most widely known and most important commercially of the polymeric polyesters is that prepared by the condensation of terephthalic acid or dimethyl terephthalate and ethylene glycol. These polyester materials, in drawn fiber or filament form, cannot be satisfactorily dyed with basic or cationic dyestuffs. It is recognized that unless the fiber-forming polyesters can be readily dyed by a variety of dyestuffs, the utility of the polymer in the textile field will be limited.

Means to impart dyeability of polyester polymer in, for example, fiber, filament, or film form with basic or cationic dyestuffs without adversely affecting the physical properties of said polymer are, of course, continuously sought in the art.

Related prior art is reflected by the disclosures of U.S. Pat. Nos. 2,895,946 and 3,018,272; in the latter, linear polyesters are prepared containing from 0.5 mole percent to about 10 mole percent of a sulfonate containing dye sensitizing unit; the polymer products produced in the practice of the claimed process reflect affinity for basic type dyes and can be utilized to prepare yarns, fabrics, and other shaped articles. U.S. Pat. Nos. 3,033,824; 3,184,434; 3,313,778; and 3,528,947 represent typical prior art procedures now available.

It is well known that the dyeing of unmodified polyesters with basic dyestuffs is not practical due to their lack of affinity for this class of dyes. For this reason, polyester fibers are usually dyed with disperse dyes; a dye-carrier and high temperature are required for good dying. However, it is sometimes difficult to obtain acceptable bright colors by this method. Therefore, the polyester industry is striving to render polyester fibers dyeable with basic dyes in order to more easily obtain these bright colors. As a result, organic sulfonic acid salts have been tested and used as modifiers to render polyester fibers dyeable with basic dyes; for example, see U.S. Pat. Nos. 3,018,272; 3,164,566; and 3,164,567. However, many of these modifiers are derivatives of monocarboxylic acids, and, therefore, function as chain terminating agents when incorporated into a polyester chain. Thus, for polyesters containing these mono-functional modifiers, there is a maximum obtainable molecular weight, which is determined by the concentration of the modifier. This principle of stoichiometric balance is well known in the literature; for example, see F. W. Billimeyer, "Testbook of Polymer Science," Inter-Science Publishers (1962), at page 251.

DESCRIPTION OF THE INVENTION

Copolyester polymers of enhanced dyeability, said copolyester containing units, as an integral part of the polymer chain derived from, sulfonamide comonomer reactants containing sulfonate groups having the formula:

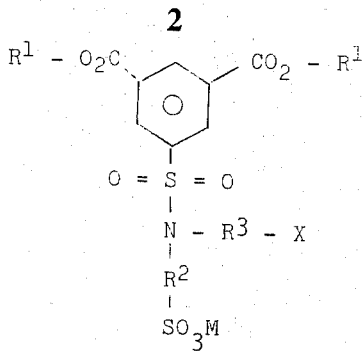

wherein $R^1$ is selected from the group consisting of H and a lower alkyl radical containing from 1 to about 4 carbons; $R^2$ is an alkylane radical of from 1 to about 10 carbons; $R^3$—X is H or a radical selected from the group consisting of an alkyl radical of from 1 to 10 carbons, cyclohexyl and an alkylene radical of from 1 to 10 carbons, said alkylene radical being —$SO_3$M terminated.

PREFERRED EMBODIMENT

It is preferred, in the practice of the present invention, to utilize, as dyeing additive, from about 0.5 to about 10 mole percent of the sodium salt of N-methyl-N-(3,5-dicarbomethyoxy) benzenesulfonyl taurine which has the formula:

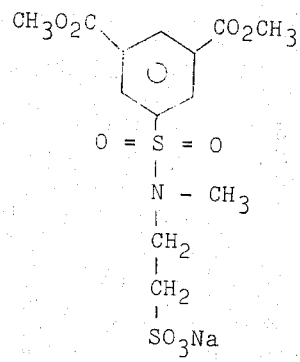

In the practice of this invention, typical polyesters which can be utilized include those set forth in U.S. Pat. Nos. 2,465,319, 2,437,232, 2,739,957, 2,895,946, and 3,018,272. Various processes which can be utilized to prepare such polyesters are set forth, for example, in U.S. Pat. Nos. 3,433,770, 3,406,152, the latter patent also disclosing the addition of additives to control pilling as well as an accepted pilling test.

Various other additives can be added to the reaction mixture, i.e., polymer melt, such as flame retardants, antistats, ester interchange catalysts as salts of calcium, manganese, or lanthanum, and, such polymerization catalysts as antimony oxide will usually be present. Color inhibitors, such as alkyl or aryl phosphate esters can also be used. In addition, pigments, delusterants, or other additives can be present, such as titanium dioxide or barium carbonate. Textbook The monomers are preferably reacted in contact with a suitable catalysts in order to shorten the reaction period and thus lessen the possibility of discoloration. Any of the well known polyesterification catalysts can be used, such as antimony oxide, zinc acetate, mangenese acetate, cobaltous acetate, zinc succinate, zinc borate, magnesium methoxide, sodium methoxide, barium oxide, cadmium formate, litharge, dibutyltin oxide, tetraisopropyl titanium silicate, and the like. The concentration of the catalyst can be varied from about 0.001 percent to about 1 percent by weight of the total amount of dicarboxylic acid compounds charged. A preferred amount is from about 0.005 percent to about 0.5 percent by weight; with the most preferred amount being from about 0.01 percent to about 0.2 percent by weight.

Yarns produced in the practice of the present invention reflect enhanced basic and disperse dye receptiveness and improved basic dye lightfastness properties; they are suitable for the usual textile applications and can be employed in the knitting or weaving of fabrics of all types as well as in the production of non-woven, felt-like products produced by known methods. Their physical properties closely parallel those of their related polyester fibers. However, they have particular sensitivity toward basic dyes. By a "basic dye" is meant a colored cationic organic substance such as those containing sulfonium, oxonium, or quaternary ammonium functional groups. Among the basic dyes which can be applied in accordance with the present invention can be mentioned Victoria Green WB (C.I. 657); Rhodamine B (C.I. 749); Brilliant Green (C.I. 662); Victoria Pure Blue BO (pr. 198); and the like. The dyes are preferably applied from an aqueous solution, with or without carrier, at a temperature between about 100°and 125°C.

Among the basic and disperse dyestuffs which readily dye the fibers produced from the copolyesters of this invention are the "Genacryl" and "Celliton" dyes discussed on pages 432 to 433 of the American Dyestuff Reporter, Volume 43, 1954, and the like.

Typical Dyestuffs which can be utilized include the following:

| | |
|---|---|
| Sevron Yellow R | Basic Yellow 11 |
| Astrazone Yellow 7 GLL | Basic Yellow 21 |
| Sevron Orange G | Basic Orange 21 |
| Maxilon Red BL | Basic Red 22 |
| Astrazone Red BBL | Basic Red 23 |
| Astrazone Red RL | Basic Red 25 |
| Sevron Red GL | Basic Red 18 |
| Sevron Blue ER | Basic Blue |
| Sevron Blue 5G | Basic Blue 4 |
| Sevron Blue BGL | Basic Blue 35 |
| Sevron Blue NF | Basic Blue |
| Resolin Blue FBLD | Disperse Blue 56 |
| Sevron Brilliant Red D | Basic Red 19 |

To obtain the modified polyesters of this invention, the modifier may simply be added directly to the reaction mixture from which the polyester will be made. Thus, these modifiers can be used as a component monomer in the original polyester reaction mixture. This mixture is then reacted to form the polyester from which fibers can be spun. The methods and details thereof by which these steps are carried out are well known to the polyester industry and, therefore, need not be specifically set forth in this text.

The novel product of this invention is a copolyester polymer, the molecular chains of which consist essentially of alkylene terephthalate or isophthalate segments and as an essential component a minor amount of units as a repeating intralinear part of the polymer chain derived from sulfonamide comonomer reactants containing sulfonate groups having the formula:

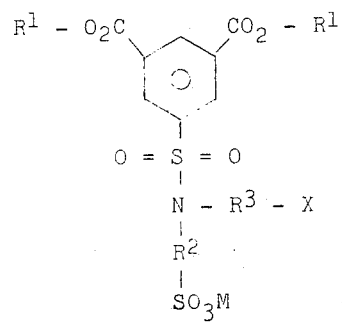

wherein $R^1$ is selected from the group consisting of H and a lower alkyl radical containing from 1 to about 4 carbons; $R^2$ is an alkylene radical of from 1 to about 10 carbons: $R^3$-X is H or a radical selected from the group consisting of an alkyl radical of from 1 to 10 carbons, cyclohexyl and an alkylene radical of from 1 to 10 carbons, said alkylene radical being -$SO_3M$ terminated; and M is selected from a group consisting of alkaline earth and alkali metals, preferably Li, Na, or K. The composition of said polyester is such as to provide therein between 0.5 and 10 mole percent of the sulfonamide comonomer containing sulfonate groups, the preferred range being 0.5 to 5.0 mole percent. The alkylene terephthalate segments may also be replaced in part by alkylene diacids or diesters thereof, for example, dimethyl azelate, the substitution ranging up to about 10 mole percent.

A convenient method for preparing the copolyester polymers of this invention involves the blending together of the aromatic diacid or diester thereof, the alkylene diol, and the sulfonamide comonomer and stirring while heating up to 230° C. in an inert atmosphere. This is followed by heating up to 300° C. under reduced pressure for the period of time required for the desired molecular weight. It is advantageous to employ catalysts to accelerate the reaction rates. Manganous benzoate and calcium acetate are suitable ester interchange catalysts while antimony trioxide and antimony tributylate have been found to be effective polycondesation catalysts.

Representative examples illustrating this invention follow:

EXAMPLE I

The sodium salt of N-methyl-N (3,5-dicarbomethoxy) benzenesulfonyl taurine,

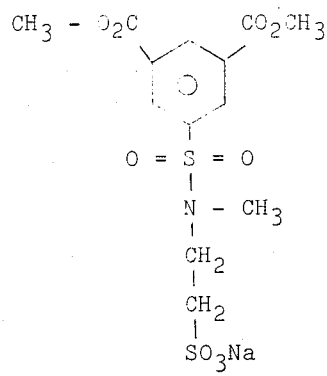

was prepared as follows: 58.4 parts of dimethyl isophthalate-5-sulfonyl chloride were dissolved in 250 parts acetone and placed in a three-necked, round-bottom flask which was fitted with a stirring rod, reflux condenser, and dropping funnel. 182 parts of a 35.3 percent aqueous solution of sodium-N-methyl taurate were added to the flask via the dropping funnel at such a rate that the acetone did not reflux. After the addition was completed (30 minutes), the resulting cloudy solution was allowed to cool to room temperature during which time a solid precipitated from the solution. This slurry was then cooled in an ice bath and filtered. The resulting solid was then dried overnight at 70° C. under reduced pressure to give 105 grams of white solid. This solid was recrystallized three times from a mixture of 90 parts ethanol (formula 30) and 10 parts water and upon drying gave 57 parts of the desired product.

EXAMPLE II 13.9 parts of the sodium salt of N-methyl-N(3,5-dicarbomethoxy)benzenesulfonyl taurine prepared according to Example I were added to 294 parts of dimethyl terephthalate, 241 parts of ethylene gycol, 0.099 parts of manganous benzoate, and 0.300 part of calcium acetate, the ratio of the sulfonamide comonomer to dimethyl terephthalate being about 2.0 mole percent. The mixture was heated for 1.0 hours, in a nitrogen atmosphere, the temperature rising to 220°C. with evolution of methanol. 0.238 part of antimony tributylate and 0.268 part of trimethy phosphate, were then added and the pressure then reduced to 0.1 mm of mercury and the temperature increased to 280°C. After 1.0 hours, a polymer was obtained having an intrinsic viscosity of 0.41. This polymer was spun and drawn as 30/6 yarn which had the following properties:

| | |
|---|---|
| Intrinsic viscosity | 0.38 |
| Tenacity, gms/denier | 2.59 |
| Breaking elongation, % | 39.6 |
| Meq. COOH/kg | 41 |

The yarn exhibited good thermal and light stability having 61.4 percent retained tenacity after being heated at 220° C. for 120 min. and 83.8 percent retained tenacity after being exposed in a Fade-ometer for 80 hours. Knit tubes prepared from this yarn were dyed in separate-but-equal dyebaths with 1.0 percent (owf.) of each of the following dyes:
1. Astrazon Red BBL - Basic Red 23
2. Genacryl Brilliant Red B - Basic Red 15
3. Sevron Orange G - Basic Orange 21
4. Resolin Blue FBLD - Disperse Blue 56

The final dyebath exhaustions were measured spectrophotometrically and the percent exhaustion was better than 90 percent for each basic dyestuff. IIIA AATCC wash tests at 160°F. and lightfastness tests in the Carbon-Arc Fade-Ometer at 10, 20, and 40 hours exposure were performed on each dyed sample and good to excellent ratings were obtained.

EXAMPLE III 19.9 parts of the sodium salt of N-methyl-N-(3,5-dicarbomethoxy)benzenesulfonyl taurine were added to 299 parts of dimethyl terephthalate, 241 parts of ethylene gycol, 16.7 parts of dimethyl azelate, 0.099 part of manganous benzoate and 0.300 part of calcium acetate, the ratio of sulfonamide comonomer to dimethyl terephthalate being about 2.0 mole percent. The mixture was heated for 1.3 hours in a nitrogen atmosphere, the temperature rising to 220° C. with evolution of methanol. 0.238 part of antimony butylate, and 0.268 part of trimethyl phosphate, were added and the pressure then reduced to 0.1 mm of mercury and the temperature was increased to 280° C. After 0.87 hours, a polymer was obtained having an intrinsic viscosity of 0.47. This polymer was spun and drawn as 30/6 yarn which had the following properties:

| | |
|---|---|
| Intrinsic viscosity | 0.41 |
| Tenacity, gms/denier | 2.65 |
| Breaking elongation, % | 24.2 |
| Meq. COOH/Kg | 60 |

Knit tubes prepared from this yarn were dyed in separate-but-equal- dyebaths with 1.0 percent (owf.) of each of the following dyes:
1. Astragon Red BBL - basic Red 23
2. Genacryl Brilliant Red B - Basic Red 15
3. Sevron Orange G - Basic Orange 21
4. Resolin Blue FBLD - Disperse Blue 56

The final dyebath exhaustions were measured spectrophotometrically and the percent exhaustion was better then 95 percent for each basic dyestuff. IIIA AATCC wash tests at 160° F. and lightfastness tests in the Carbon-Arc Fade-Ometer at 10, 20, and 40 hours exposure were performed on each dyed sample and excellent ratings were obtained.

EXAMPLE IV

A series of copolyester polymers were prepared as described in Example II with 1.0, 1.5, 1.75, and 3.0 mole percent, respectively, of the sodium salt of N-methyl-N(3,5-dicarbomethoxy) benzenesulfonyl taurine. these polymers were spun and drawn as 30/6 yarn which had tenacities that ranged from 2.64 to 3.56 grams per denier. A dyeing evalution was carried out as described in Example II and the yarn from medium to dark shades depending upon the concentration of the added comonomer. The dye and lightfastness of these samples ranged from good to excellent.

EXAMPLE V 4.32 parts of the sodium salt of N-methyl-N-(3,5-dicarbomethoxy)benzenesulfonyl taurine were added to 108 parts of dimethyl terephthalate, 81 parts of ethylene gycol, 0.364 part of manganous benzoate, and 0.110 part of calcium acetate, the ratio of the added comonomer to dimethyl terephthalate being about 1.75 mole percent. The mixture was heated for 2.0 hours in a nitrogen atmosphere, the temperature rising to 200° C. with evolution of methanol. 0.0864 part of antimony tributylate and 0.351 parts of the glycol ester of phosphoric acid were added and the pressure then reduced to 0.1 mm of mercury and the temperature was increased to 280° C. After 1.05 hours, a polymer was obtained having an intrinsic viscosity of 0.47. This polymer was spun and drawn as 70/24 yarn which had the following properties:

| | |
|---|---|
| Intrinsic viscosity | 0.47 |
| Tenacity, gms/denier | 3.32 |
| Breaking elongation, % | 25.8 |
| Meq. COOH/Kg | 28 |

The results of a dyeing evaluation (described in Example II) of this yarn are illustrated in the following table.

| Dyestuff | Percent Dyebath Exhaustion | Dye Washfastness Ratings | Dye Lightfastness Ratings After Exposure 10 hrs. | 20 hrs. |
|---|---|---|---|---|
| Astrazone Red BBL | 75 | 5 | 5 | 4 |
| Sevron Orange G | 98 | 5 | 4-5 | 4 |
| Resolin Blue FBLD | 76 | 5 | 5 | 4 |

Ratings: 1 = very poor; 2 = poor; 3 = fair; 4 = good; 5 = excellent.

EXAMPLE VI

The sodium salt of N-β -sulfoethylene-(3,5-dicarbomethoxy)benzene sulfonamide:

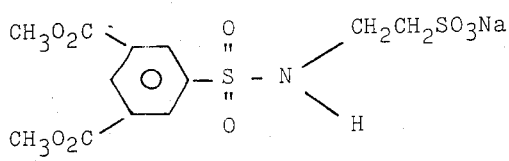

was prepared by dissolving 50.0 parts of taurine and 16.0 parts sodium hydroxide in 110 parts water and placing the resulting solution in a three-necked, round-bottom flask which was fitted with a stirring rod, reflux condenser, and dropping funnel. 58.4 parts of dimethyl isophthalate-5-sulfonyl chloride was dissolved in 250 parts acetone and added to the flask via the dropping funnel at such a rate that the acetone did not reflux. After the addition was completed, the contents of the flask were stirred for 1 hour, cooled in an ice bath, and filtered. The resulting solid was recrystallized from a mixture of 85 parts isopropyl alcohol and 15 parts water and upon drying gave 15.5 parts of the desired product.

EXAMPLE VII 12.5 parts of the sodium salt of N-β-sulfoethylene-(3,5-dicarbomethoxy)benzene sulfonamide prepared according to Example VI were added to 294 parts of dimethyl terephthalate, 241 part of ethylene glycol, 0.099 parts of manganous benzoate, and 0.300 part of calcium acetate, the ratio of the sulfonamide comonomer to dimethyl terephthalate being about 2.0 mole percent. The mixture was heated for 1.0 hour, in a nitrogen atmosphere, the temperature rising to 220° C. with evolution of methanol. 0.238 part of antimony tributylate and 0.067 parts of trimethyl phosphate, were then added and the pressure then reduced to 0.1 mm of mercury and the temperature increased to 280° C. After 1.0 hour, a polymer was obtained having an intrinsic viscosity of 0.52. This polymer was satisfactorily dyed with Sevron Orange G. and with Sevron Blue 5G.

EXAMPLE VIII 4.3 parts of the disodium salt of N-bis(β-sulfoethylene)-(3,5-dicarbomethoxy)benzene sulfonamide were added to 297 parts of dimethyl terephthalate, 241 part of ethylene glycol, 0.099 parts of manganous benzoate, and 0.300 part of calcium acetate, the ratio of the sulfonamide comonomer to dimethyl terephthalate being about 0.5 mole percent. The mixture was heated for 1.0 hour, in a nitrogen atmosphere, the temperature rising to 220° C. with evolution of methanol. 0.238 part of antimony tributylate and 0.268 part of trimethyl phosphate, were then added and the pressure then reduced to 0.1 mm of mercury and the temperature increased to 280° C. After 1.0 hour, a polymer was obtained having an intrinsic viscosity of 0.48. This polymer was satisfactorily dyed with Sevron Orange G. and Sevron Blue 5G.

The following specific dye sensitizing sulfonamide salts can be prepared and substituted in any one of the preceding examples, with a minimum of routine experimentation, to produce essentially the same results.

The sodium of N-cyclohexyl-N-β-sulfoethylene-(3,5-dicarbomethoxy)benzene sulfonamide:

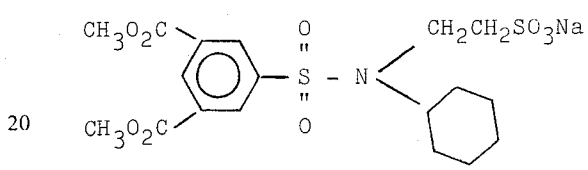

The disodium salt of N-bis(γ-sulfopropylene)-(3,5-dicarbomethoxy)benzene sulfonamide:

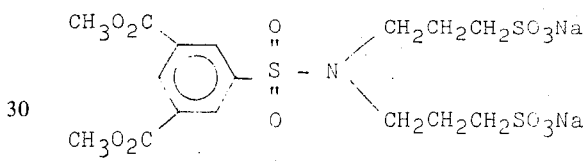

In the preceding representative examples, the particular alkaline earth and alkali metal donating reactant utilized can be varied within the skill of the art and the teachings of our specification to achieve essentially the same results.

The R' radicals of our dye sensitizing unit can be H or lower alkyl of from 1 to 4 carbon atoms; the methoxy derivative is preferred to minimize process contamination as to alcohol given off during polymerization.

The particular disulfonate metal salts of the preceding examples can be routinely varied, within the context of this specification as understood by one skilled in the art to produce different species thereof and then said species utilized to achieve substantially the same results.

The sulfonamide comonomeric dye senitizing reactant containing one or more sulfonate groups should, for best results, be of reasonably purity to insure the preparation of fully processable and dyeable copolyester polymer; this requirement can be readily met by one skilled in the art with a minimum of routine analysis and experimentation. Said reactant must, of course, also be sufficiently heat stable to perform effectively as a dye sensitizing reactant and to avoid polymer degradation.

This invention provides the textile art with novel and improved modified polyesters, which modified polyesters retain the physical properties required, for example, for filaments thereof utilized in textile applications, and which are readily dyed by conventional techniques with the class of dyes known as basic or cationic dyestuffs to deep and useful shades of color.

The preceding representative Examples can be varied as to selected component and amounts within the skill of one versed in the art to achieve substantially the

What is claimed is:

1. Copolyester polymer consisting essentially of segments selected from the group consisting of alkylene terephthalate and alkylene isopthalate and containing units derived from about 0.5 to about 10 mole percent sulfonamide comonomer dye sensitizing reactant having the formula:

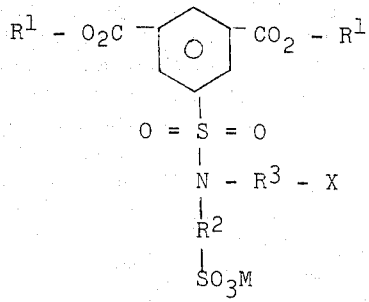

wherein $R^1$ is selected from the group consisting of H and a lower alkyl radical containing from 1 to about 4 carbons; $R^2$ is an alkyl radical of from 1 to about 10 carbons; $R^3$—X is H or a radical selected from the group consisting of an alkyl radical of from 1 to 10 carbons, cyclohexyl and an alkylene radical of from 1 to 10 carbons, said alkylene radical being —$SO_3M$ terminated; and M is selected from the group consisting of alkaline earth and alkali metals.

2. Copolyester polymer consisting essentially of segments selected from the group consisting of alkylene terephthalate and alkylene isophthalate and containing units derived from about 0.5 to about 10 mole percent containing sulfonamide comonomer dye sensitizing reactants containing sulfonate groups as a repeating intralinear part of the polymer chain, said dye sensitizing reactant having the formula:

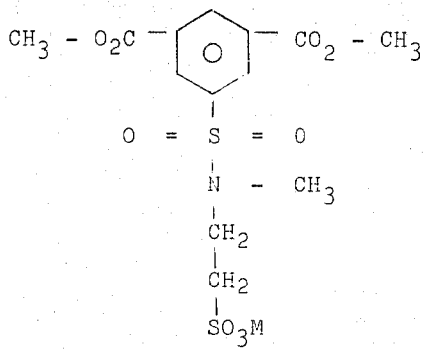

wherein M is selected from the group consisting of alkaline earth and alkali metals.

3. Copolyester polymer according to claim 2 wherein M of said dye sensitizing reactant is Na.

4. Cationic dyeable fiber forming copolyester polymer consisting essentially of segments selected from the group consisting of alkylene terephthalate and alkylene isophthalate and containing units derived from about 0.5 to about 5 mole percent sulfonamide comonomer dye sensitizing reactants containing sulfonate groups as a repeating intralinear part of the polymer chain, said dye sensitizing reactant having the formula:

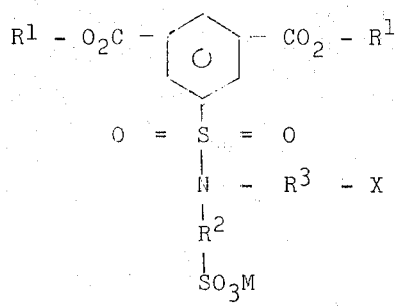

wherein $R^1$ is selected from the group consisting of H and a lower alkyl radical of from 1 to about 4 carbons; $R^2$ is an alkyl radical of from 1 to about 10 carbons; $R^3X$ is H or a radical selected from the group consisting of an alkyl radical of from 1 to 10 carbons, cyclohexyl and an alkylene radical of from 1 to 10 carbons, said alkylene radical being —$SO_3M$ terminated; and M is selected from the group consisting of alkaline earth and alkali metals.

5. Cationic dyeable fiber forming copolyester polymer consisting essentially of segments selected from the group consisting of alkylene terephthalate and alkylene isophthalate and containing units derived from 0.5 to about 5 mole percent sulfonamide comonomer dye sensitizing reactant containing sulfonate groups as a repeating intralinear part of the polymer chain, said dye sensitizing reactant having the formula:

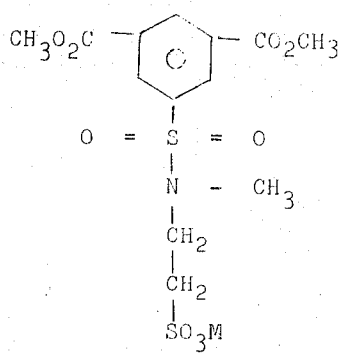

wherein M is selected from the group consisting of alkaline earth and alkali metals.

6. Copolyester polymer according to claim 5 wherein M of said dye sensitizing reactant is Na.

7. Cationic dyeable fiber forming copolyester polymer consisting essentially of segments selected from the group consisting of alkylene terephthalate and alkylene isophthalate and containing units derived from 0.5 to about 5 mole percent sulfonamide comonomer dye sensitizing reactants containing sulfonate groups as a repeating intralinear part of the polymer chain, said dye sensitizing reactant having the formula:

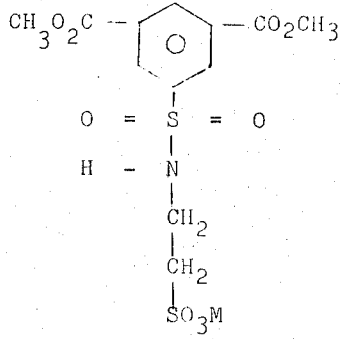

wherein M is selected from the group consisting of alkaline earth and alkali metals.

8. Copolyester polymer according to claim 7 wherein M of said dye sensitizing reactant is Na.

9. Cationic dyeable fiber forming copolyester polymer consisting essentially of segments selected from the group consisting of alkylene terephthalate and alkylene isophthalate and containing units derived from 0.5 to about 5 mole percent sulfonamide comonomer dye sensitizing reactants containing sulfonate groups as a repeating intralinear part of the polymer chain, said dye sensitizing reactant having the formula:

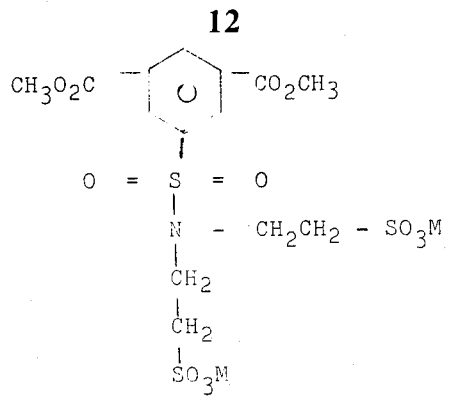

wherein M is selected from the group consisting of alkaline earth and alkali metals.

10. Copolyester polymer according to claim 9 wherein M of said dye sensitizing reactant is Na.

* * * * *